(12) United States Patent
Jackson

(10) Patent No.: US 11,505,373 B2
(45) Date of Patent: Nov. 22, 2022

(54) RECEPTACLE HAVING A TAMPER RESISTANT LOCKING MECHANISM FOR PRODUCE AND FOODSTUFF

(71) Applicant: Greener Shapes Inc., Rocky River, OH (US)

(72) Inventor: Douglas C. Jackson, Rocky River, OH (US)

(73) Assignee: Greener Shapes Inc., Rocky River, OH (US)

( * ) Notice: Subject to any disclaimer, the term of this patent is extended or adjusted under 35 U.S.C. 154(b) by 392 days.

(21) Appl. No.: 16/778,119

(22) Filed: Jan. 31, 2020

(65) Prior Publication Data

US 2021/0237946 A1 Aug. 5, 2021

(51) Int. Cl.
*B65D 43/02* (2006.01)
*B65D 43/16* (2006.01)

(52) U.S. Cl.
CPC ....... *B65D 43/0254* (2013.01); *B65D 43/164* (2013.01); *B65D 2401/10* (2020.05); *B65D 2543/0062* (2013.01); *B65D 2543/00694* (2013.01); *B65D 2543/00731* (2013.01); *B65D 2543/00805* (2013.01)

(58) Field of Classification Search
CPC .............. B65D 43/0254; B65D 43/164; B65D 2401/10; B65D 2543/0062; B65D 2543/00694; B65D 2543/00731; B65D 2543/00805; B65D 2543/00703; B65D 2543/00814

See application file for complete search history.

(56) References Cited

U.S. PATENT DOCUMENTS

| | | | |
|---|---|---|---|
| 5,307,948 | A | 5/1994 | Blackburn et al. |
| 5,507,406 | A | 4/1996 | Urciuoli et al. |
| 5,788,105 | A | 8/1998 | Foos |
| 7,073,680 | B2 | 7/2006 | Boback et al. |
| 7,118,003 | B2 | 10/2006 | Sellari et al. |
| D585,735 | S | 2/2009 | Vovan et al. |

(Continued)

FOREIGN PATENT DOCUMENTS

| | | |
|---|---|---|
| CA | 2565256 C | 2/2012 |
| GB | 2464791 A | 5/2010 |

*Primary Examiner* — James N Smalley
(74) *Attorney, Agent, or Firm* — Lerner, David, Littenberg, Krumholz & Mentlik, LLP

(57) ABSTRACT

A produce and foodstuff receptacle is disclosed containing a tamper evident locking mechanism to lock a separate lid and container. The receptacle has a fitted corner for allowing lid and container attachment in only one position. Lid and container matching connectors allow secure and reusable attachment. After locking, only a container tab is fully detached after the receptacle is initially opened to indicate use. The lid remains fully intact after opening and hides the detached container portion underneath a locking tab platform for protection against any perforated edges. Matching connectors allow re-sealing after initial opening of the locking mechanism. The lid also contains a lid lock ledge that matches with a container lock ledge that submerges the lid into the container. The locking tab platform allows re-opening of the lid and container after use and contains a hinge for flexibility of the platform during closing and opening of the lid.

19 Claims, 10 Drawing Sheets

(56) References Cited

U.S. PATENT DOCUMENTS

| | | |
|---|---|---|
| 7,631,776 B2 | 12/2009 | Vovan et al. |
| 8,056,750 B2 | 11/2011 | Vovan |
| 8,123,064 B2 | 2/2012 | Vovan |
| 8,186,531 B2 | 5/2012 | Parikh et al. |
| 8,240,505 B1 | 8/2012 | Chen |
| 8,256,636 B2 | 9/2012 | Huffer |
| 8,608,008 B2 | 12/2013 | Gingras et al. |
| 8,640,914 B2 | 2/2014 | Meyer et al. |
| 8,672,166 B2 | 3/2014 | Nazareth et al. |
| 8,684,212 B2 | 4/2014 | Stone et al. |
| 9,187,209 B1 | 11/2015 | Hanna et al. |
| 9,527,633 B2 | 12/2016 | Chen |
| 9,592,937 B1 | 3/2017 | Wang |
| 9,745,106 B2 | 8/2017 | Siskindovich et al. |
| 9,828,149 B2 | 11/2017 | Wang |
| 2003/0183540 A1* | 10/2003 | Onishi ................. B65D 43/168 206/205 |
| 2007/0138180 A1 | 6/2007 | Vovan |
| 2012/0048774 A1 | 3/2012 | Gingras et al. |
| 2014/0231433 A1 | 8/2014 | Liu |
| 2015/0028033 A1 | 1/2015 | Samuel |
| 2017/0057706 A1* | 3/2017 | Wang ................. B65D 43/0254 |
| 2021/0139206 A1* | 5/2021 | Wang ................. B65D 51/1627 |

* cited by examiner

RECEPTACLE HAVING A TAMPER RESISTANT LOCKING MECHANISM FOR PRODUCE AND FOODSTUFF

TECHNICAL FIELD

An apparatus and method of using a receptacle with a tamper resistant locking mechanism. More particularly, a receptacle for produce and foodstuff having a reusable and separate lid and container with a tamper evident lock that indicates whether the receptacle is opened or tampered with while allowing reuse of the receptacle.

BACKGROUND

Early detection of whether produce or food stuff is tampered with in its container is vital to the preservation of the contents of the container. Regulatory agencies also demand that food is safely handled in the distribution and marketing of produce. The industry has responded with packaging that shows evidence that the packaging has been opened or tampered with to notify consumers that food safety has been compromised. A tamper-evident package has one or more indicators or barriers to entry that give visible evidence to consumers that tampering have occurred. The Food Safety Modernization Act of 2013 requires that the food processors have written plans that identify hazards, specify the steps that will be put in place to minimize or prevent those hazards, identify monitoring procedures and record monitoring results and specify what actions will be taken to correct problems that arise. Proper handling and packaging protect the consumer, but the industry has seen that additional steps are needed to insure their produce while in the possession of the final seller of the goods.

Most current state of the art tamper evident trays contains an attached bowl section and a lid section in a so-called clam shell design. Typically a detachable hinge connects the bowl section and the lid section that is removed prior to opening to give a visual indication the container has been opened. This type of design typically gives exposure to sharp perforated edges. For tamper evident designs that have separate bowl and lid sections, the sections are typically connected with a detachable hinge again exposing the consumer to sharp perforated edges from the detachable hinge. In addition, the use of separate lid and bowl sections opens up issues of mismatches between the lid and bowl sections. For both types of current tamper evident clam-shell type designs and separate lid/bowl designs, current state of the art tamper evident packaging either has a removable and disposable strip and/or a frangible tear strip or perforated that is actually part of either the bowl or lid or both. In both cases, and the consumer is exposed to sharp edges of the packaging, and the removable piece is disposed of after opening.

U.S. Pat. No. 7,118,003 issued to Sellari et al on Oct. 10, 2006 and U.S. Pat. No. 7,073,680, issued to Boback et al on Jul. 11, 2006 both illustrate tamper evident packages where there is a separable or disposable tab or strip that is externally mounted. In these designs, the consumer must remove a strip that is delimited by two parallel score lines. The consumer once having removed the strip grasps the lid of the tray along one of the parallel score lines to remove the lid from the tray. The lid is configured so that there are no external edges available for one to remove the lid from the tray except by removing the strip. The hinge connecting the lid and the bowl is destroyed by the removal of the strip and the bowl and lid are essentially then become two pieces. The score edges are the only way to unseal or open the package.

There are many issues with the use of this style of packaging, including the disposal issues of the "ripped" strip and the fact that the user must use a razor sharp corrugated or escalloped style edge to open the container. This danger is present due to the fact that the area that is being ripped is thicker than the rest of the package as it needs to withstand the forces of separation and the plastic that is exposed is very stiff and sharp. U.S. Pat. No. 7,073,680 to Boback attempts to mitigate the consumer being subjected to this razor sharp edge with the use of patterned sections on opposing tabs. However, the sharp edges still exist and the disposal issues are still prevalent.

Another style of tamper evident packaging involving a strip is the style where the strip encompasses the entire package, such as disclosed in U.S. Pat. No. 5,307,948 issued to Blackburn et al on May 3, 1994, where the frangible strip bars access to the lid portion until the strip is removed completely. This style works on smaller circular packaging and creates the similar issues with disposal and the presence of a sharp demarcation or separation line.

U.S. Pat. No. 5,788,105 issued to Foos on Aug. 4, 1998, U.S. Pat. No. 8,123,064 issued to Vovan issued on Feb. 28, 2012 and in U.S. Pat. No. 8,186,531 issued to Parikh et al on May 29, 2012. Illustrate a removable tab that performs the same basic function of the strip, as the consumer is required to remove a tab that is usually integrated into the lid and container or lid section of the package. Removal of the tab gives the user to access into the package and provides a positive indication that once the tab is removed, the package has been tampered. However, a tab must be broken or removed to open the package.

The same issues regarding disposal and the sharpness of the edges of the plastic opening area are still prevalent. Parikh discloses a tab that can remain attached to the package on its side as the "blocking member" can be relocated back to the "blocking position". This presents an issue as to whether the user will be able to observe quickly that the package has evidence of tampering and should the user remove the tab completely; the user is faced with exterior sharp edges where the tab was present previous to its removal and the associated disposal problems as well. Vovan combines a tear-open barrier and a tab to signify tampering or previous use of the product after the initial load. One embodiment of the Vovan discloses that they provide a slot through which the lip slips through and locates itself under the tab, providing a semi-hinge and an apparatus that prevents the removal of the lid from the body, but the raw corners from the breakaway tab are still externally located that pierce the users' fingers.

U.S. Pat. No. 7,631,776 issued to Vovan et al on Dec. 15, 2009 and U.S. Pat. No. 8,256,636 issued to Huffer on Sep. 4, 2012 discloses an internal zone of deformation to signify tampering. Both patents have an external tab or flange that is not destroyed or removed to show tampering thereby eliminating the disposal issues. But neither of the patents has eliminated the issue regarding the exposing of sharp plastic edges ripped from a perforated line. Both of these patents, where the tear line is internal to the package use some form of adhesive in the construction of the packaging. This highlights the detriment of only being a single use application and the need to use and apply a substance to the container increasing manufacturing time and efforts thereby increasing costs and by the introduction of non-plastic components to the container causes contamination that might preclude their recyclability in later processes.

U.S. Patent Publication US2015/0028033A1 to Samuel published Jan. 29, 2015 illustrates both a separate lid and container and also a combined lid and container designs with a detachable lid tab. This type of design still exposes the consumer to sharp plastic edges as the detachable lid portion is affixed to the container after opening. In addition, this design to Samuel does not facilitate reuse because the affixed tab portion on the container prevents the lid from being seated and sealed properly on the container. The removable lid tab does not provide the user with a complete visual indicator that the package has been opened because a portion of the tab remains on the container. In addition, the portion of the removable lid tab that remains on the container has sharp edges that further expose the user to potential harm. Furthermore the lid can be place in various positons on the container further subjecting the consumer to sharp plastic edges from both the lid and container because the removable lid tab has portions on both these items. This arrangement further prevents proper sealing in the container because the removable lid tab need to be perfectly aligned with the portion that remains on the container or else the lid and container will not seal properly.

Thus there still remains a need for a tamper evident package without the above drawbacks. Furthermore there also remains a need in the art for a re-useable tamper evident package that gives the user a clear indication that the package has been opened.

SUMMARY OF THE INVENTION

The present invention solves the problems of current state of the art and provides many more benefits. Disclosed is an apparatus and method of using a receptacle having a tamper resistant locking mechanism for produce and food stuff. In one aspect, the receptacle includes a lid having a plurality of sides, a top and a bottom.

The lid further has a lid fitted corner disposed on the bottom of the lid and a plurality of receiving snap fit cylinders located on the bottom of the lid in a middle section of each lid side. The container is separate from the lid and has a plurality of side walls defining an opening, and a bottom. A container ridge is disposed inside the side walls. An outer ridge of the container is disposed around the outside of container at the opening of the container.

The container further includes a container fitted corner formed by at least two sides of the container. The container fitted corner matches the lid fitted corner so that the lid can only be placed on the container in one manner. A plurality of attaching snap fit cylinders is disposed along the container ridge located in a container middle section of each container side.

A tamper resistant locking mechanism includes an undetachable lid locking tab platform located past or beyond the lid's outside perimeter profile. The undetachable lid locking tab platform is attached to the top of the lid by a living hinge for allowing the platform to flexibly move in an upward and downward directions. The undetachable lid locking tab platform further includes an undetachable lid locking tab underneath the platform. The tamper resistant locking mechanism also includes a container detachable locking tab located past or beyond the container's outside perimeter profile at a corner of the container. The container detachable locking tab is located between a plurality of container handle ledges fixedly attached to the side of the container.

The lid attaches to the container when the bottom of the lid is supported on the container ridge and the receiving snap fit cylinders engage with the attaching snap fit cylinders in a non-permanent locking manner. The tamper resistant locking mechanism is engaged when the undetachable lid locking tab engages with the detachable container locking tab. When the lid is removed after the tamper resistant locking mechanism is engaged, the detachable container locking tab fully detaches from the container and the detachable container locking tab is securely attached underneath the undetachable lid locking tab platform to provide protection from any sharp edges of the detachable container locking tab.

In another aspect, a method of using a receptacle having a tamper resistant locking mechanism for produce and food stuff, includes the following steps. A receptacle is provided having a lid with a plurality of sides, a top and a bottom. The lid further has a lid fitted corner disposed on the bottom of the lid and a plurality of receiving snap fit cylinders located on the bottom of the lid in a middle section of each lid side.

Provided also is a separated container having a plurality of side walls defining an opening, and a bottom. A container ridge is disposed inside the side walls. The container further including a container fitted corner formed by two sides of the container. The container fitted corner matches the lid fitted corner so that the lid may only attach to the container in one direction or manner. A plurality of attaching snap fit cylinders along the container ridge is located in a container middle section of each container side.

Provided also is a tamper resistant locking mechanism having an undetachable lid locking tab platform is located past or beyond the lid's outside perimeter profile. The undetachable lid locking tab platform is attached to the top of the lid by a living hinge. The undetachable lid locking tab platform further has an undetachable lid locking tab underneath the platform. A container detachable locking tab is located past or beyond the container's outside perimeter profile at a corner of the container. The container detachable locking tab is located between a plurality of container handle ledges fixedly attached to the outer side of the container.

The method further includes attaching the lid to the container to allow the bottom of the lid to be supported on the container ridge. The receiving snap fit cylinders are engaged with the attaching snap fit cylinders in a non-permanent locking manner to permit re-usability of the receptacle or lid/container combination. After the lid is engaged on the container, the tamper resistant locking mechanism is engaged by attaching the undetachable lid locking tab to the detachable container locking tab. Before attaching the lid to the container, placement of produce and/or food stuff is done into the container.

To access the contents of the receptacle, a user may grasp with one hand one of the container ledges on either side of the undetachable lid tab locking platform, and pull up the lid platform. Pulling the lid platform will detach the container locking tab completely from the container and leave a space or void between the container ledges as a visual indication that the receptacle has been tampered with or opened. The user may also with one hand pull up on the lid platform to detach the container locking tab. The container locking tab is securely attached to the undetachable lid platform protecting against any sharp edges from the dislodged container locking tab.

After the tamper resistant locking mechanism is engaged, and the detachable container locking tab detaches from the container, the lid is allowed to be completely removed from the container and the contents of the receptacle may be accessed.

In another aspect, the lid may be reattached to the container after the container locking tab is detached. The space that is created from the removal of the container locking tab when the lid is initially opened allows easy resealing of the lid to the container by using the snap fit cylinders. The resealing is done in a non-permanent manner.

The lid can only be attached in one direction due to the fitted corners of the lid's bottom and the container's sides that both have the same sized enlarged arcs "A." The arcs on the corner of the lid and container have the same radius when measured from the center of the lid and center of the container, respectively for each arc or shape. The lid also contains a lid lock ledge that matches with a container lock ledge that submerges the lid into the container. The lid's locking tab platform allows re-opening of the lid and container after use. The lid's locking tab platform contains a living hinge for flexibility of the platform during closing and opening of the lid.

The above objects and advantages are met by the present invention. In addition the above and yet other objects and advantages of the present invention will become apparent from the hereinafter-set forth Brief Description of the Drawings, Detailed Description of the Invention and claims appended herewith.

These features and other features are described and shown in the following drawings and detailed description.

BRIEF DESCRIPTION OF THE DRAWINGS

So that those having ordinary skill in the art will have a better understanding of how to make and use the disclosed device and method, reference is made to the accompanying figures wherein.

DETAILED DESCRIPTION

Figure 1:
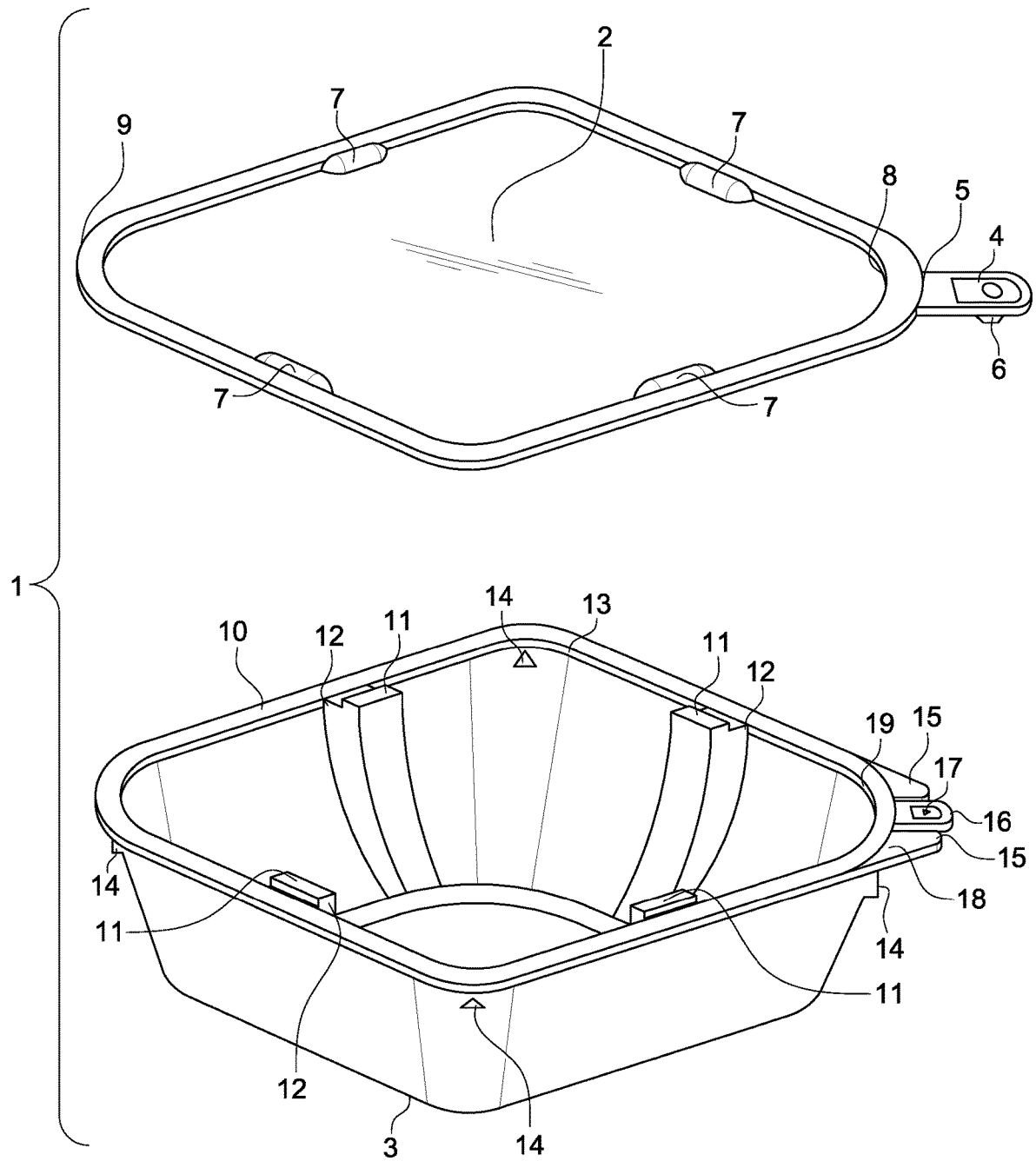
FIG. 1 is an unassembled perspective view of a lid and a container for the receptacle having a locking mechanism for produce and foodstuff.

In general, the invention overcomes the disadvantages of past attempts to detect disease-specific antigens. The invention's device and method provides for a produce and foodstuff receptacle 1 containing a tamper evident locking mechanism to lock a separate lid 2 and container 3. The tamper evident mechanism provides a clear indication that the receptacle has been opened after the mechanism is activated. The indication of tampering or opening the receptacle is shown by a clear opening or space 140 created between two container handle ledges 15 disposed on the outside of container 2 when the detachable container locking tab 16 is removed by the undetachable lid locking tab platform 4 and undetachable lid locking tab 6 located under the platform 4. The receptacle 2 has a lid fitted corner 8 and a receiving container fitted corner 19 for allowing lid and container to attach in only one position. This feature allows the receptacle to ensure that the lid and container are seated properly for an accurate seal.

As further described herein, the lid and container also contain matching connectors to allow secure and reusable attachment after the tamper evident locking mechanism is used and the lid opened. The lid has a plurality of receiving snap fit cylinders 7 and the container has a plurality of matching and attaching snap fit cylinders 11 for secure and non-permanent attachment that allows re-use of the container and lid after the container's locking tab 16 is fully removed. After locking, only the detachable container locking tab 16 is fully detached after the receptacle is initially opened to indicate use. The lid remains fully intact after opening and hides the detached container tab 16 underneath the lid's locking tab platform 4 for protection against any perforated edges. Matching connectors 7 and 11 allow re-sealing after initial opening of the locking mechanism. The lid also contains a lid lock ledge 9 that matches with a container lock ledge 10 to allow the lid to be securely submerged into the container. The lid is recessed into the container to avoid any potential tampering with the lid. The locking tab platform 4 allows re-opening or re-use of the lid and container after use and contains a hinge 5 for flexibility of the platform during closing and opening of the lid. Preferably, the hinge 5 is a living hinge as further described.

Figure 7:
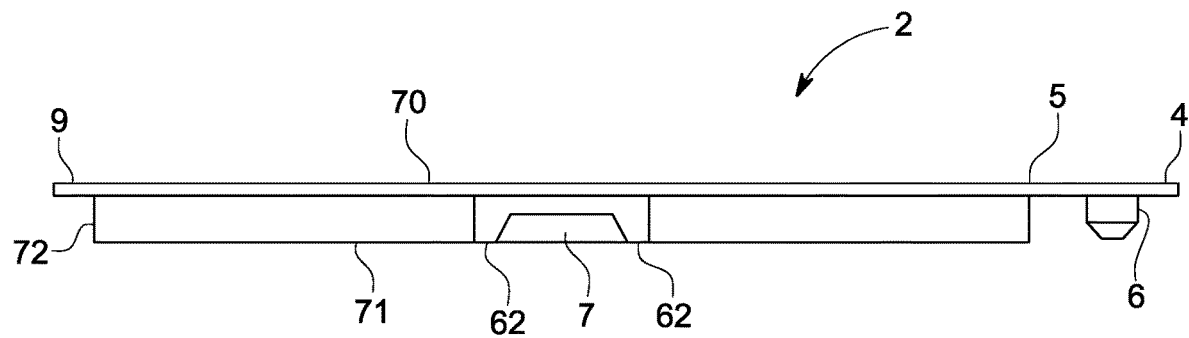
FIG. 7 is a side view of the lid of FIG. 1.

As shown in FIG. 1, a receptacle 1 comprises a lid 2 and a container 3. Though the lid container is shown in a square configuration, depending on the embodiment other shapes may be available that comport with the features of the invention described herein. Lid 2 as shown in FIG. 7 includes a top 70, a bottom 71 and a side 72. The lid locking ledge 9 is disposed around the top of the lid. Receiving snap fit cylinders 7 are arranged at middle sections of each side of the lid for joining with matching connectors of the container. The lid fitting corner 8 is located on the bottom of the lid for joining of a matching fitting corner of the container.

A portion of the tamper evident locking mechanism includes a lid's undetachable locking tab platform 4. The platform 4 is located outside the perimeter of the lid. Platform 4 further includes an undetachable lid locking tab 6 disposed underneath the platform. Both the platform and the locking tab of the lid are undetachable and remain intact with the lid before and after use of the tamper evident locking mechanism. The platform 4 is attached to the lid 2 by a hinge 5. Again, preferably the hinge is a living hinge. A living hinge is a thin flexible hinge or flexure bearing made from the same material as the two rigid pieces it connects. It is typically thinned or cut to allow the rigid pieces to bend along the line of the hinge. Depending on the implementation, the material used for the lid and platform is selected from a group consisting of a polymer, polypropylene (PP), polyethylene (PE), polyethylene terephalate (PET), polybutylene terephalate (PBT), a poly-blend, polyvinyl chloride (PVC), and any combination thereof. The living hinge 5 allows the platform to move freely in an upward and downward direction to allow a user to close the lid and activate the tamper evident locking mechanism and open the lid.

FIG. 1, also shows the receiving portion of the tamper evident locking mechanism attached to container 3. The container includes a ledge 80 that the detachable container locking tab is attached thereto. The ledge is the side portion of the outer ridge of the container 20 shown in FIG. 3 and FIG. 4. The container's detachable tab 16 defines a locking tab opening 17. Depending on the implementation the shape of the locking tab opening may be different configurations. The locking tab opening of the container locking tab receives the locking tab 6 of the lid. Once connected the locking tab 6 is permanently affixed in the locking tab opening. Opening the lid by pulling the lid platform 4 in an upward direction will remove container detachable locking tab 16 from the container in its entirety to give a visual indication that the receptacle has been opened. On either sides of the locking tab 16 are container handle ledges 15. The handle ledges are also connected to the outer ridge of the container 20. The handle ledges are for the user, if desired, to hold onto when pulling the platform 4 in an upward direction and/or when connecting the tab 6 into the opening 17. Again depending on the embodiment, these actions of opening the lid and/or closing the lid to engage the tamper evident locking mechanism may be a one handed operation. The handle ledges further include ribs 18. The ribs 18 may be in various formations and angles with respect to each other for providing increased gripping of the handle ledge.

The container 3 further includes side walls, and a bottom 33. An opening of the container is defined by the side walls and is opposite the bottom 33. A container ride 13 is formed inside the container below the opening of the container. The container ridge 13 provides additional support to the lid when it is seated inside the container. It also allows the lid to be recessed inside the container. Attaching snap fit cylinders 11 are parallel to the ridge 13 and located at a mid-section of each side of the container to match the receiving snap fit cylinders 7 of the lid. A snap fit platform 12 is disposed around each snap fit cylinder 11 to provide support to the snap fit cylinders 11 and also to provide support to the lid when it is engaged with the container. Again a container locking ledge 10 is positioned above the container ridge 13, and the locking ledge 10 engages with lid lock ledge 9 to create a seal, and prevents opening the lid without use of the locking platform 4 by attempts to pry open the lid at another point in the lid. The ledges 9 and 10 attach in a non-permanent manner. Depending on the embodiment the ledges 9 and 10 combine similar to matching tongue and groove joints known to those skilled in the art. The container also includes a plurality of triangular protrusions 14 that are disposed on the outside of the container on the side walls of the container. Preferably protrusions 14 are on the outside corners of the container. The protrusions are used to reduce sticking when the container is stacked inside another similar container for storage, shipping or other processing reasons. The protrusion gives an anti-stinking feature to the container 3 by providing additional space between similar container when stacked inside each other.

Figure 2:
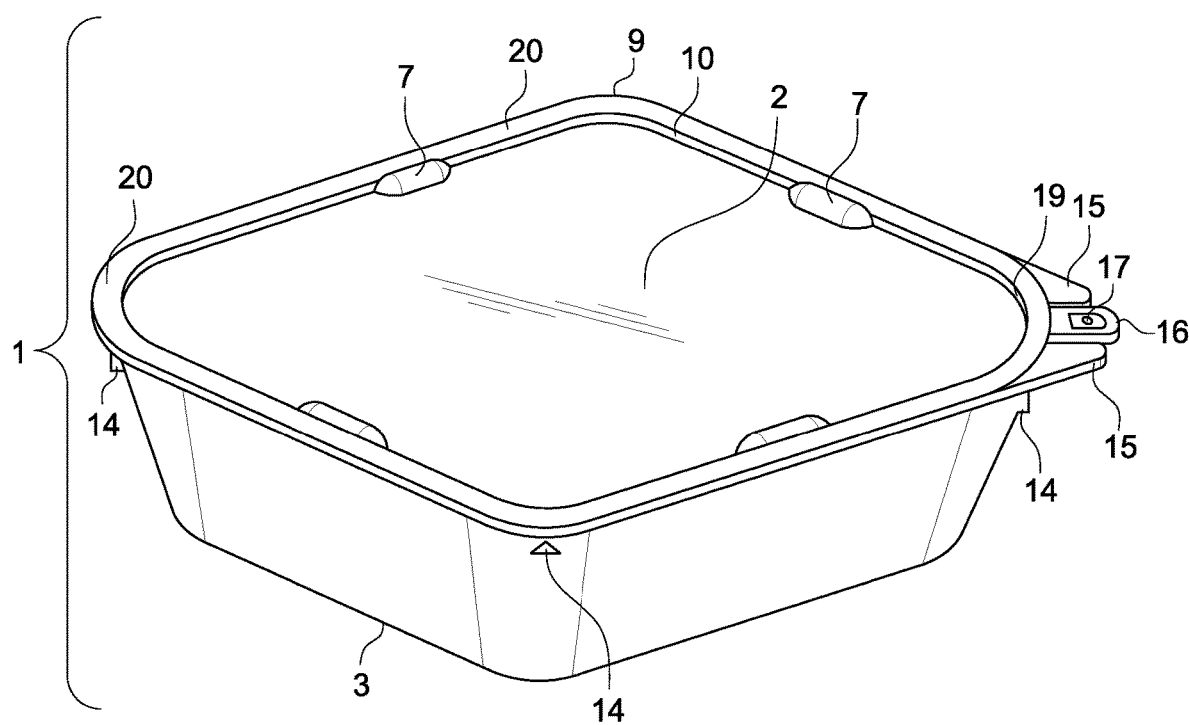
FIG. 2 is an assembled perspective view of the lid and container of FIG. 1.

FIG. 2 shows the assembled receptacle 1 where lid 2 is inside container 3. The receiving snap fits 7 are engaged with the attaching snap fits of the container. The locking tab opening 17 of the detachable container locking tab 16 is engaged in a permanent snap fitting manner with the locking tab 6 of the lid platform 4 in a permanent fixing manner. The lid lock ledge 9 is resting on the matching container lock ledge 10 as previously described in a tongue groove manner. The lid's fitted corner is secure within the container's matching fitted corner 19 by frictional forces between the matching corners of the lid and container. The lid 2 is recessed well below the container's outer ridge 20 that is in the same plane as to the opening of the container. Again, this submerged lid prevents any attempt to open the lid other than using the locking tab platform 4 attached to the lid.

Figure 3:
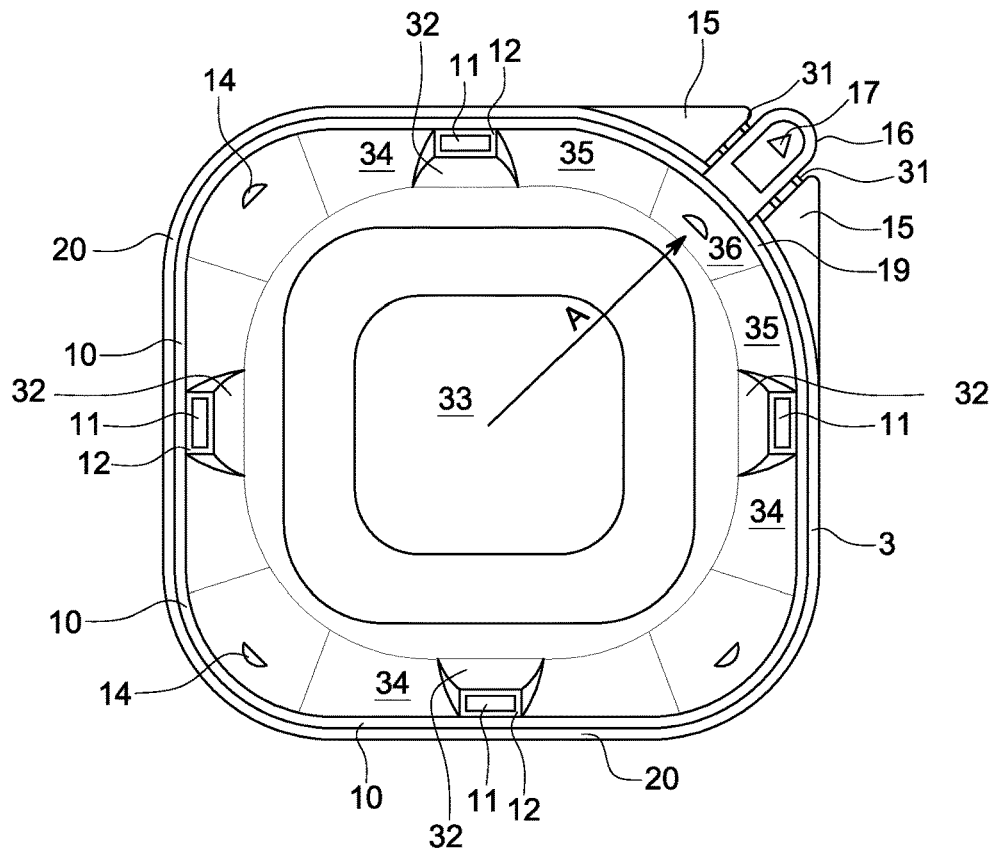
FIG. 3 is a top view of the container of FIG. 1.
Figure 4:
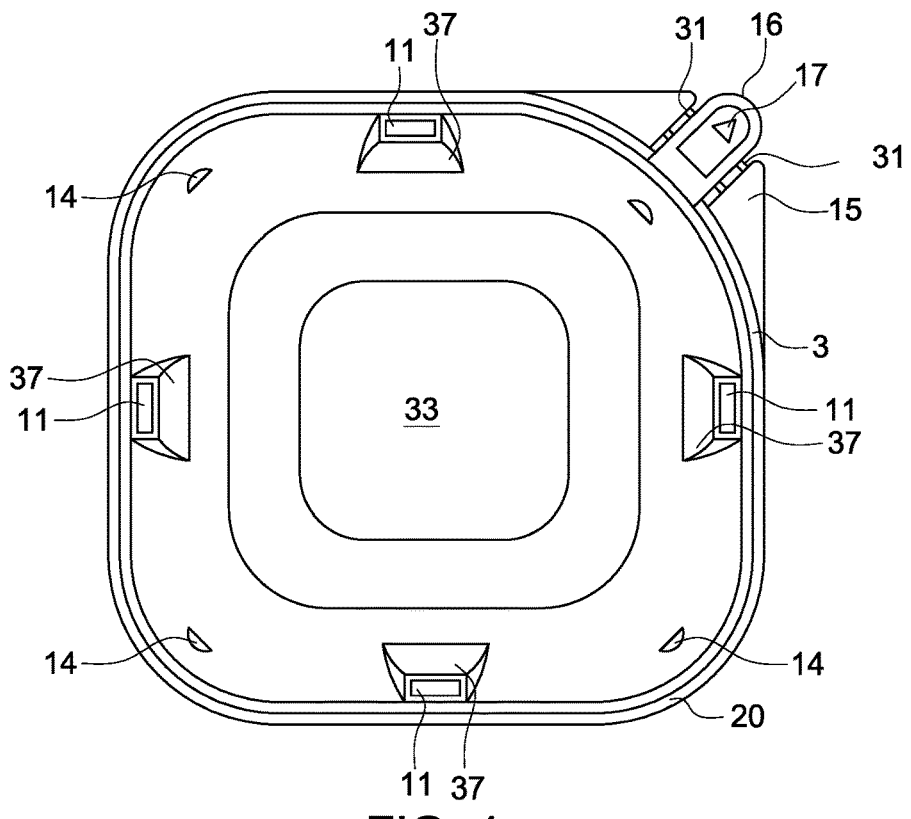
FIG. 4 is a bottom view of the container of FIG. 3.

FIG. 3 and FIG. 4 illustrate the top and bottom view of the container 3, respectively. In FIG. 3, side walls 34 make up three-quarters of the sides of the container. The last portion of the side walls are wall sections that form the matching fitted corner 19 of the container. Shown are side walls 35 and 36 that connect to side walls 34. All the side walls connect to the bottom 33 of the container. Side walls 35 and 36 have an enlarged curvature or are "A." The arc has a greater radius, measured from the center point of bottom 33, than the other corners of the container. This enlarged arc allows the lid and container to only be assembled in one position where both the lid and the container have their enlarged arc sections matched together. Depending on the embodiment other shapes and geometric features may be used for this matching section of the lid and container.

Detachable container locking tab 16 further defines the locking tab opening 17. The opening is shown as a triangular opening; however, other shapes and designs may also be used to permanently affix the lid's locking tab within the opening 17. The detachable container locking tab is connected to the container's outer ledge 80 (shown in FIG. 8) that is the side of the container's outer ridge 20 by at least one breakaway portion 31. The detachable locking tab is also connected by breakaway portions 31 on either sides of the detachable tab to container handle ledge 15. When the tab 16 is completely removed when the lid's platform 4 is pulled in an upward direction, the handles 15 define a spacing or opening that indicates the lid has been removed after the locking mechanism was activated thereby showing tampering. FIG. 3 also shows snap fit support columns 32 that support the snap fit platform 12 and attaching snap fit cylinder 11. FIG. 4 illustrates the bottom view of the container. A recessed portion 37 forms on the bottom of the container and is the negative impression of the support column 32 on the inside of the container. Depending on the implementation, ribs 18 on handles 15 may be disposed on one side of the handles 15 or on both sides of the handles. Placing the ribs on both sides of the handles in various angular configurations would increase the gripping force onto the container as compared to having only one side of the handles with the ribs 18.

Figure 5:
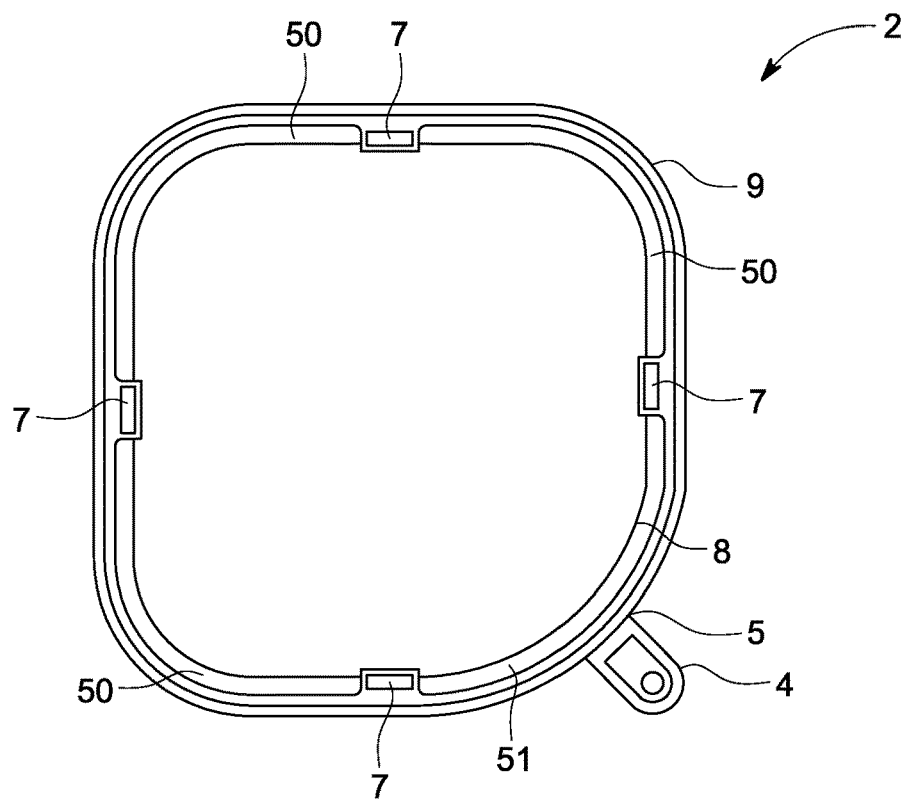
FIG. 5 is a top view of the lid of FIG. 1.
Figure 6:
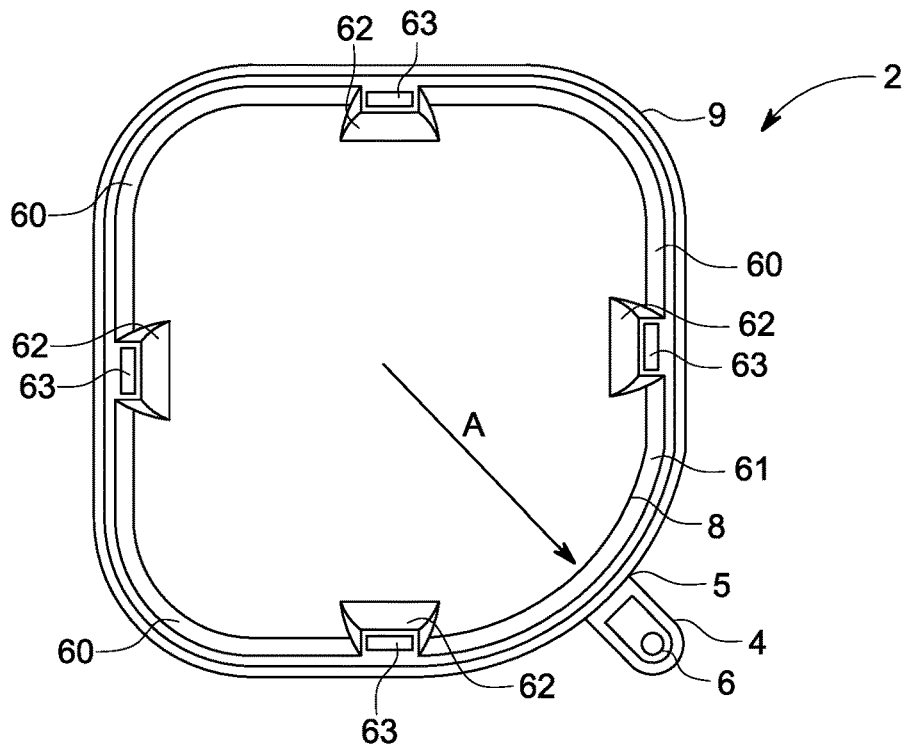
FIG. 6 is a bottom view of the lid of FIG. 5.

FIG. 5 and FIG. 6 are top and bottom view of the lid 2 respectively. Shown is the outer locking ledge 9 that matches with the containers locking ledge 10. Also shown are support ridges on the top of the lid to add strength and integrity to the lid structure. Because of enlarge corner 8 of the lid that matches with the containers corner 19, ridge 51 is larger than ridge 50. Again the undetachable tab 4 is connected to the lid 2 by the hinge 5. Locking tab 6 is underneath the platform 4 as shown in FIG. 6. These lid components and the lid itself are unaffected by the activation of the tamper resistant locking mechanism. All the lid components remain intact and are not detached even after the locking mechanism is activated and then later unlocked. Only the container's detachable locking tab 16 structure is affected.

FIG. 5 and FIG. 6 also show more detail of the receiving snap fit 7. The receiving snap fit 7 is raised when viewed from the top of the lid and creates a depression 63 when viewed from the bottom of the lid as shown in FIG. 6. A raised portion 62 as viewed from the bottom of the lid provides support for the lid and interacts with the snap fit platform of the container by providing supportive rest when the lid and the container are connected together. Again are "A" as measured for the lid from the center of the lid to the enlarged lid corner 8 has a greater radius than the other lid corners. Depressions 60 is the back side of ridges 50 and provide support for the lid structure. Depression 61 is larger than depression 60 because of the fitted corner 8 radius dimensions are larger than the other corners as previously described.

Figure 8:
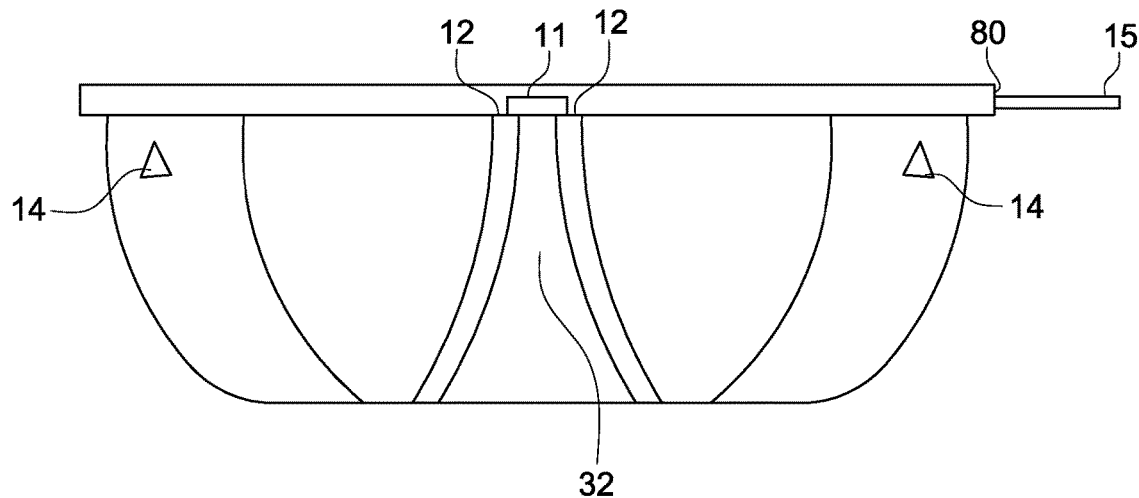
FIG. 8 is a side view of the container of FIG. 1.

FIG. 7 and FIG. 8 illustrate the lid and the container, respectively, when view from the side. The lid lock ledge is attached to the top 70 of the lid 2. The undetachable lid locking tab platform 4 are connected to the lid's side 72 via the hinge 5. The locking tab 6 again is underneath the platform 4. The locking tab 6 may have a conical shape or other form known to those skilled in the art to perform a permanent snap fit function. The receiving snap fit connection 7 is shown with the raised portion 62 providing support for the lid when attached and when the bottom 71 rests on the containers ridge 13. FIG. 8 shows the container's attaching snap fit cylinder 11 and snap fit platform 12. The raised portion 62 rests on platform 12 when the lid is engaged into the container. Snap fit support column 32 supports the attaching snap fit cylinder 11 and platform 12. The handle ledge 15 and detachable container locking tab 16 are attached to the contained at container ledge 80. Protrusions 14 on the container project outwardly from the container.

Figure 9:
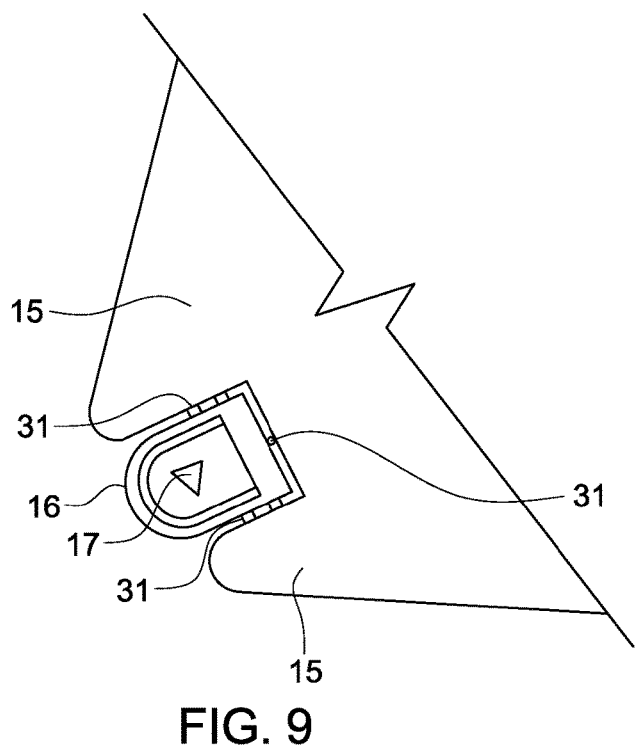
FIGS. 9-11 illustrate lid locking tab opening variation of the lid of FIG. 1.
Figure 10:
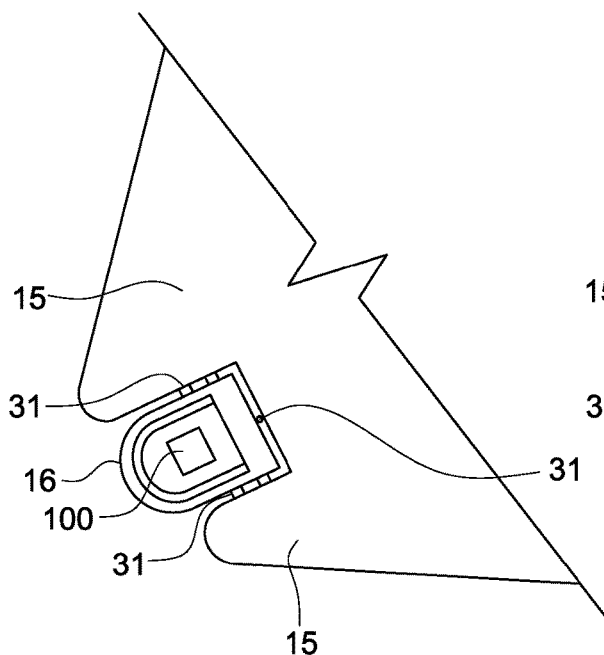
Figure 11:
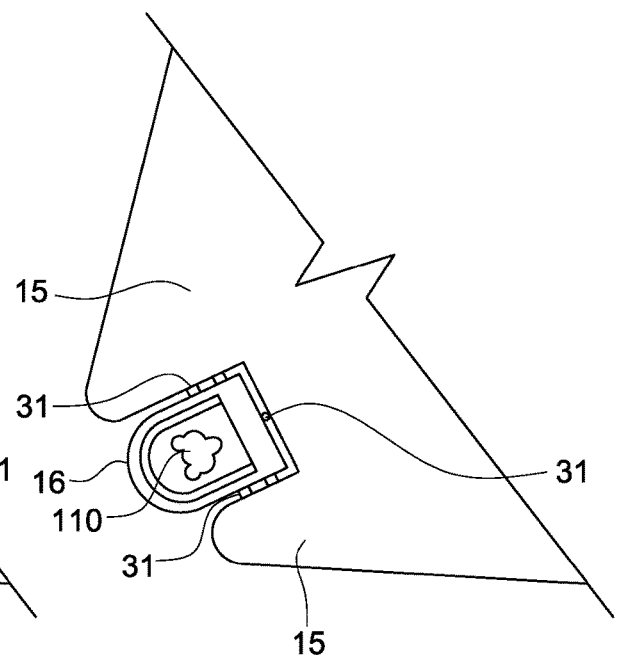

FIG. 9, FIG. 10, and FIG. 11 are a few illustrations of different embodiments for the opening of the detachable container locking tab. These embodiments are not meant to limit the configuration of the opening and are given as examples in the spirit of the invention. Depending on the implementation, the opening may have a triangular shape as shown in opening 17. Again detachable breakaway portions 31 removably connect the detachable locking tab to the ledge handles and the container. Depending on the embodiment, at least two breakaway portions 31 are connected to the detachable locking container tab on either side of tab 16 to connect with right and left handle ledges 15. In addition at least one detachable breakaway portion connects a back of the tab 16 to the container 3. The breakaway portion 31 may, depending on the embodiment, be a thinned portion of plastic that was formed with the container. The formation of the container may be thermoforming injection molding or other processing methods know to one skilled in the art. In addition, a secondary post processing method may score the area around the tab 16 to form the breakaway portions 31. This scoring technique is not preferred because it is a post processing procedure that would increase time and cost in the production of the container. FIG. 10 illustrates a square configuration 100 for the opening and FIG. 11 illustrates a multi-circular configuration 110 for the opening of the container locking tab.

Figure 12:
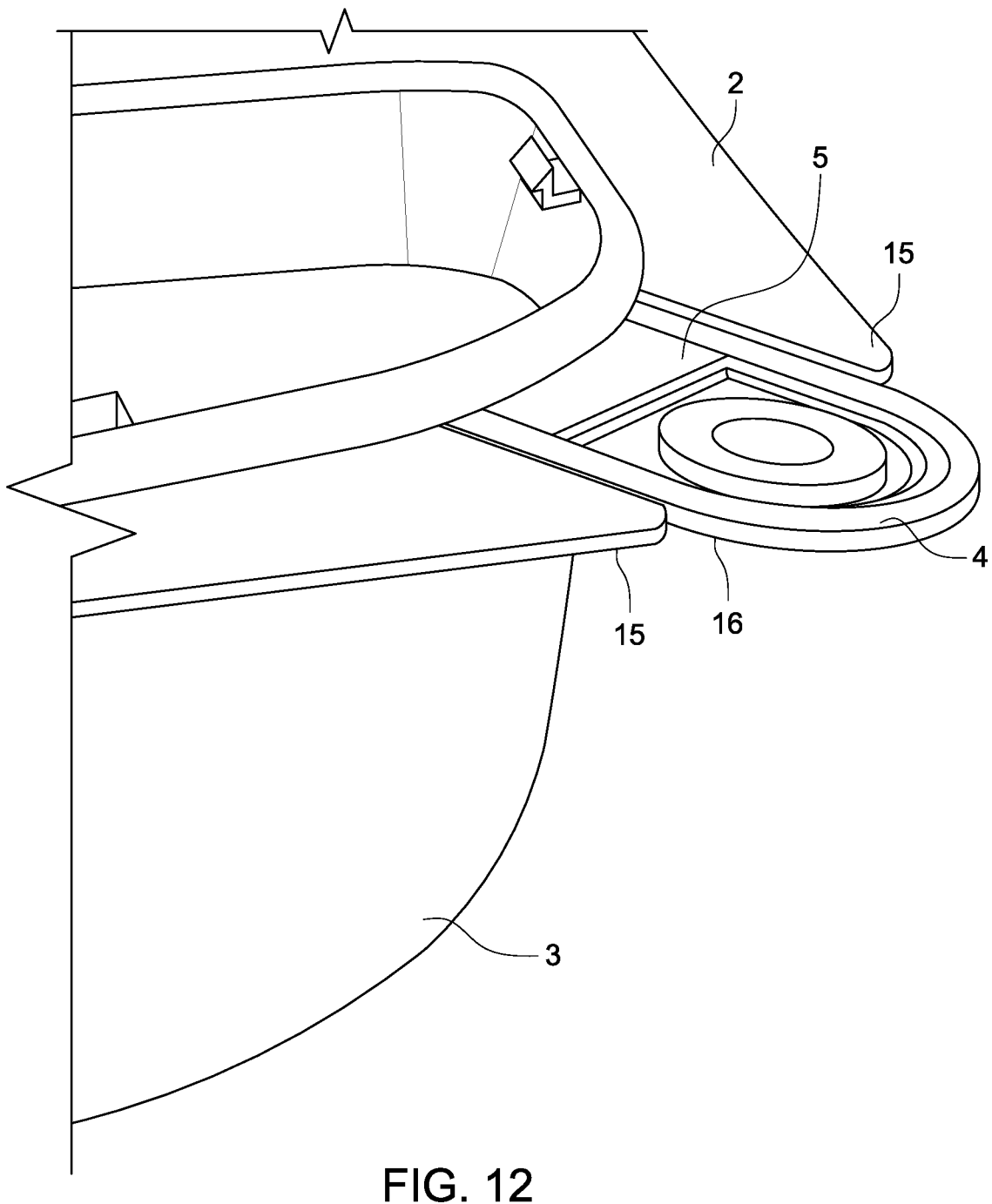
FIG. 12 is photograph showing an enlarged assembled perspective view of the lid and container in FIG. 1 illustrating a tamper evident locking mechanism engaged.
Figure 13:
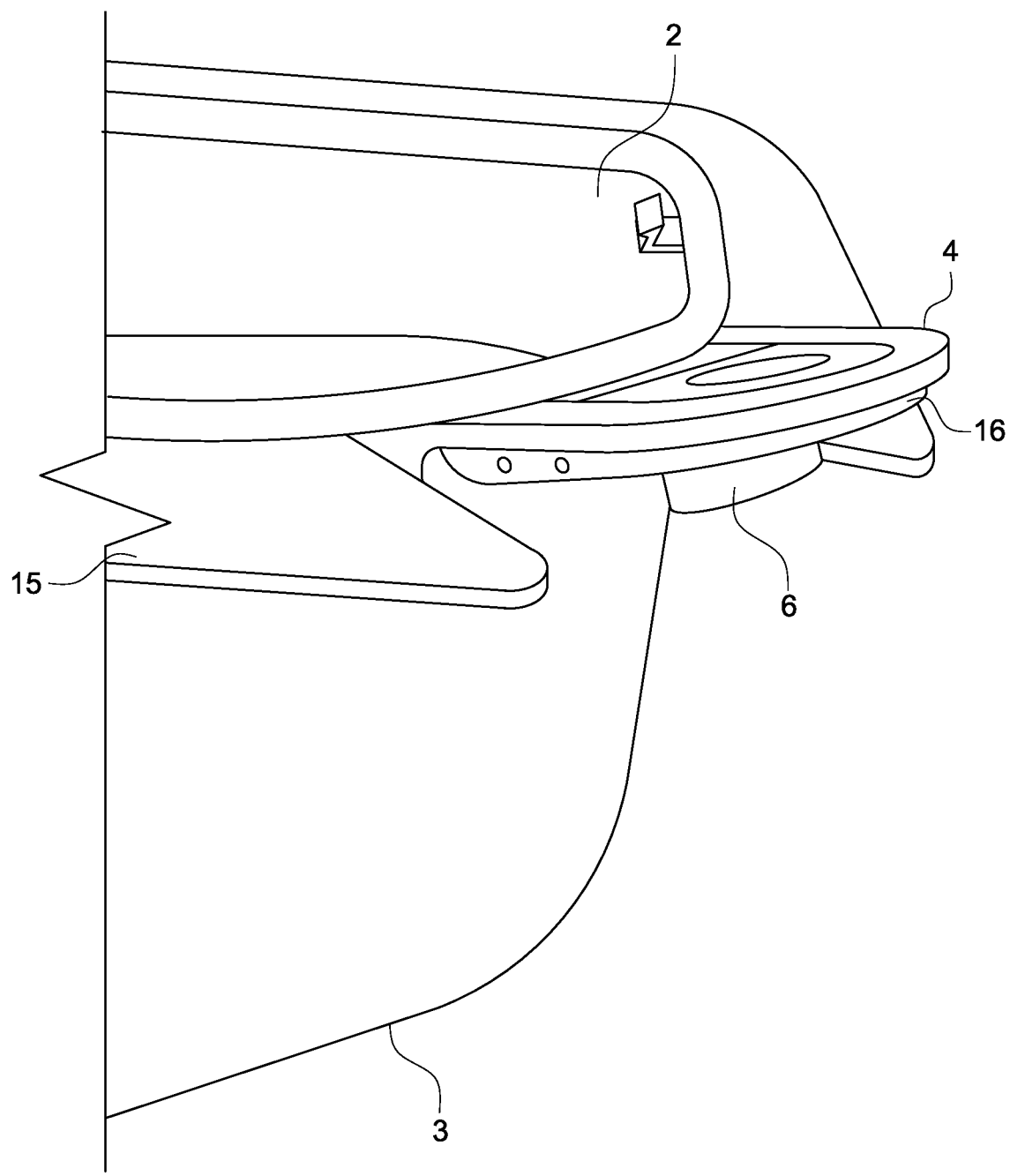
FIG. 13 is a photograph showing the enlarged assembled perspective view of FIG. 12 illustrating the tamper evident locking mechanism activated by removal of the detachable container locking tab.

FIG. 12 and FIG. 13 illustrate how the tamper resistant locking mechanism functions. As shown in FIG. 12, the lid's undetachable licking tab platform 4 has its locking tab 6 fixedly inserted into the opening in the containers detachable locking tab 16. Again the container ledges 15 may or may not be used to provide assistance in activating the locking mechanism. The hinge 5 connected to platform 4 allows additional flexibility in the platform to apply force to insert the tab 6 into the opening in the containers locking tab 16. As shown in FIG. 13, the platform 4 is moved in an upward direction relative to the bottom of the container 3. All the breakaway portions 31 become detached and the detachable container locking tab is affixed to the undetachable lid locking tab 6 underneath platform 4 of lid 2.

Figure 14:
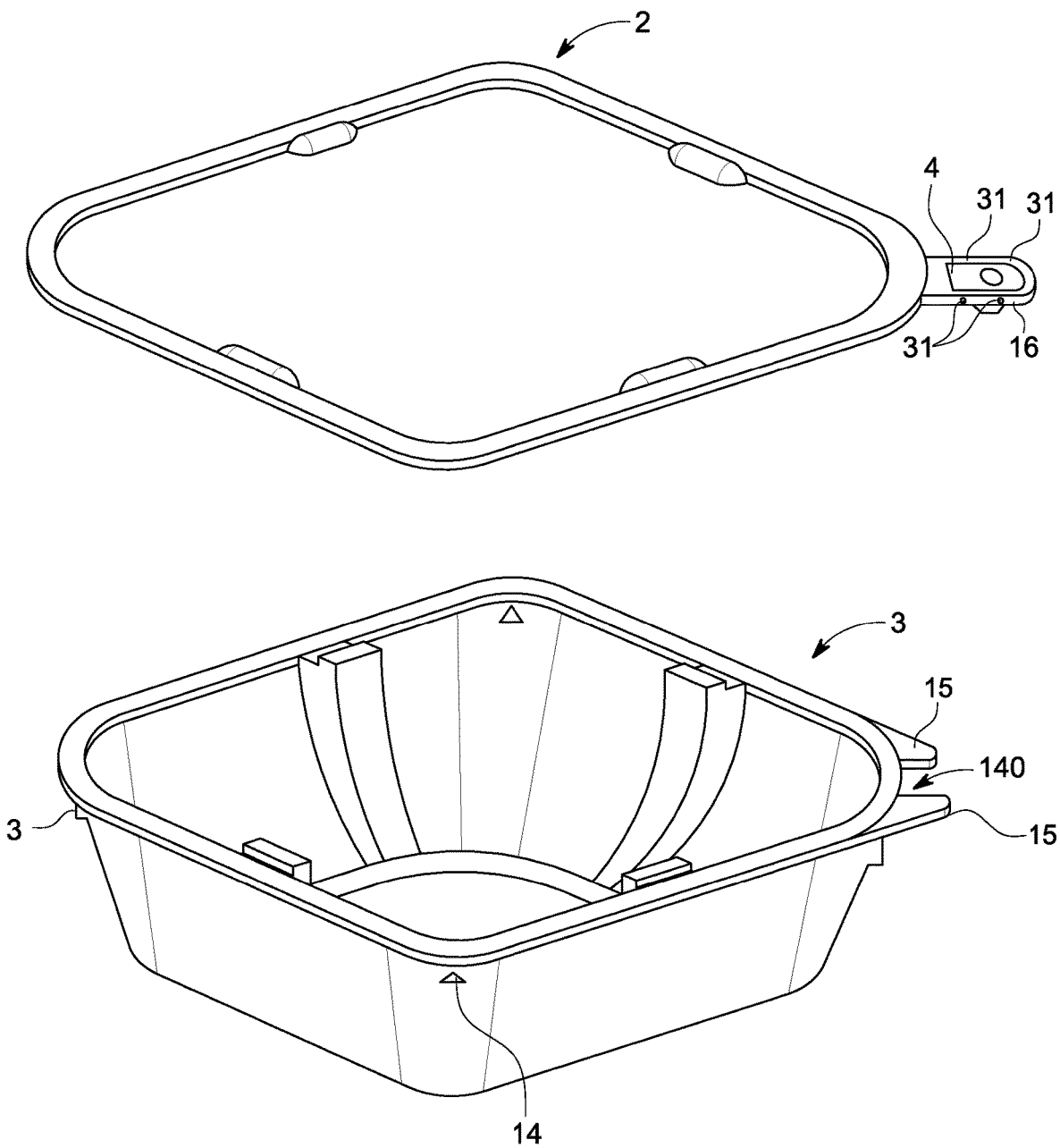
FIG. 14 illustrates a perspective view of FIG. 13 when the lid is completely removed.

FIG. 14 illustrates the lid removed after the locking mechanism was engaged. As shown the detachable locking tab 16 from the container is underneath the lid's platform 4 protecting users from sharp edges caused by the detachment from the container. Also shown is the space 140 that is created in the container and defined by the handle ledges 15 and container 3. The space 140 is a visual and physical indicator that the lid has been removed after the tamper resistant locking mechanism was engaged. The space 140 also serves as a clear path for the lid to be secured on the container should a user desire to reuse the container. Again the attaching and receiving snap fits allow multiple use of the receptacle if desired and will secure the lid on the container until removed by moving the tab 4 upwardly. This feature may be advantageous to users that desire the use of the receptacle to store left overs of the contents not initially used in the receptacle. However, the tamper resistant locking mechanism is only a one time use and once the container tab 16 is detached it cannot be reattached to the container.

The attachment of the detachable container tab 16 underneath the lid's platform 4 has many advantages. It eliminates the possibly of detachment causing disposal issues as well as prevents the exposure of the edge of the plastic to the user. The elimination of the exposed edge after the tamper resistant mechanism is unlocked or open is a critical need and this invention not only has the perforation edge securely attached to avoid disposal issues but shields the perforated edges by safely covering the sharp edges underneath the lid's platform 4. In addition, unlike other tamper evident contains that leave remains of the tamper evident portion on the container; the invention completely removes the tamper evident portion to avoid any exposure to sharp edges on the container. This complete removal of the container's locking tab to form space 140 also furthers reattachment of the lid back on the container should the user desire to reuse the container.

Figure 15A:
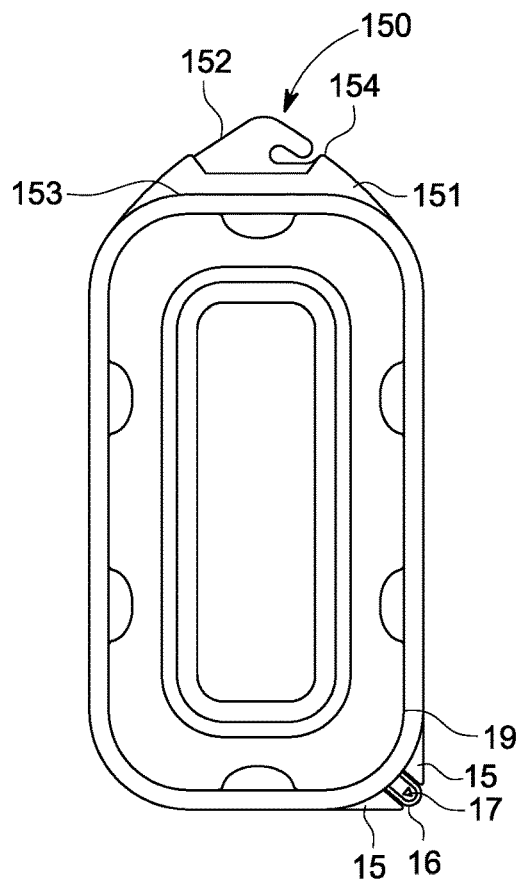
FIGS. 15A and 15B illustrate a perspective view and top view, respectively of a container having a handle hook for storage and display.
Figure 15B:
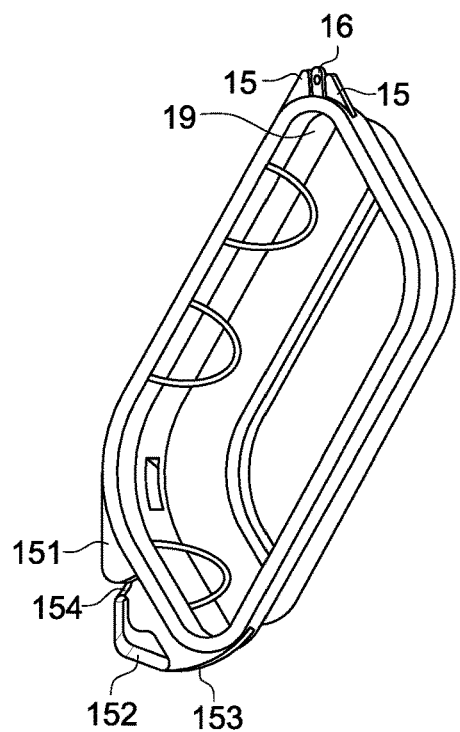

FIG. 15A and FIG. 15B illustrate an additional feature of the container. In addition to the detachable locking tab 16, the container may contain on an opposite end of the container from the tab 16 a handle tray 150. Handle tray 150 includes a handle ledge 151, a handle hook 152, a secondary handle ledge 153 and a hooking area 154. Hooking area 154 is an open space defined by the handle ledge, handle hook and secondary handle ledge. The handle tray 150 may be used to hook the container, and thus the receptacle if the lid is attached in a display. In addition the handle tray may be used for ease of storage of the container or receptacle if the lid is attached to the container, because the hooking area 154 may be attached to any suitable hook for attachment and storage or display.

Though in this disclosure, only a single tamper resistant locking mechanism per receptacle, this does not preclude having more than one similar type locking mechanism for larger containers. This invention herein disclosed and detailed has its application for packaging where the lid is the top piece that interfaces with a lower container. This disclosure is not limited to only those applications, as some packaging has a lid that is actually the lower section and the container is the top section. This invention may be utilized in the reverse of the disclosure herein.

While there has been shown and described various embodiments of the instant invention it is to be appreciated that the invention may be embodied otherwise than is herein specifically shown and described and that, within said embodiments, certain changes may be made in the form and arrangement of the parts without departing from the underlying ideas or principles of this invention as set forth in the claims appended herewith.

What is claimed is:

1. A receptacle having a tamper resistant locking mechanism for produce and food stuff, comprising:
   a lid having a plurality of sides, a top and a bottom, the lid further having a lid fitted corner disposed on the bottom of the lid and a plurality of receiving snap fit cylinders located on the bottom of the lid in a middle section of each lid side;
   a container having a plurality of side walls defining an opening, and a bottom and a container ridge disposed inside the side walls, the container further including a container fitted corner formed by two sides of the container, the container fitted corner matching the lid fitted corner, and a plurality of attaching snap fit cylinders along the container ridge located in a container middle section of each container side;
   a tamper resistant locking mechanism having an undetachable lid locking tab platform located past the lid and outside a lid perimeter profile, the undetachable lid locking tab platform attached to the top of the lid by a living hinge, and the undetachable lid locking tab platform further having an undetachable lid locking tab thereunder; and a container detachable locking tab located past the container and outside a container perimeter profile at a corner of the container and the container detachable locking tab located between a plurality of container handle ledges fixedly attached to the container;
   wherein the lid attaches to the container when the bottom of the lid is supported on the container ridge and the receiving snap fit cylinders engage with the attaching snap fit cylinders in a non-permanent locking manner, and the tamper resistant locking mechanism is engaged when the undetachable lid locking tab engages with the detachable container locking tab;
   wherein when the lid is removed by pulling a lid platform in an upward direction after the tamper resistant locking mechanism is engaged, the detachable container locking tab detaches from the container and the detachable container locking tab is securely attached underneath the undetachable lid locking tab platform to provide protection from any sharp edges of the detachable container locking tab; and
   wherein the container further includes a plurality of container snap fit support columns that support a snap fit platform surrounding the attaching snap fit cylinders on the container.

2. The receptacle of claim 1, wherein the lid is re-sealable with the container before the tamper resistant locking mechanism is engaged, and after the tamper resistant locking mechanism is engaged and the detachable container locking tab is detached.

3. The receptacle of claim 1, wherein the lid further includes a lid locking ledge disposed around the top of the lid.

4. The receptacle of claim 3, wherein the container further includes a container lock ledge disposed inside the container and below the opening of the container, and wherein when the lid is attached to the container, the lid is securely attached to by the lid locking ledge and the container locking ledge.

5. The receptacle of claim 4, wherein the lid is recessed in the container.

6. The receptacle of claim 1, wherein the container further includes a snap fit platform surrounding the attaching snap fit cylinders on the container for supporting the attaching snap fit cylinders and providing additional support to the lid when attached to the container.

7. The receptacle of claim 1, wherein the container detachable locking tab further defines a locking tab opening for receiving the undetachable lid locking tab in a permanent snap fitting manner.

8. The receptacle of claim 7, wherein the Locking tab opening is in a shape selected from a group consisting of a circle, a triangle, a square, a polygon, an ellipse, a multi-circular form, a multi-geometric form, a circle surrounded by smaller half circles, and any combination thereof.

9. The receptacle of claim 1, wherein the container further includes a triangular protrusion located at an outside intersection of at least two sides of the container for providing an anti-sticking release when the container is stacked inside another similar container.

10. A receptacle having a tamper resistant locking mechanism for produce and food stuff, comprising:
    a lid having a plurality of sides, a top and a bottom, the lid further having a lid fitted corner disposed on the bottom of the lid and a plurality of receiving snap fit cylinders located on the bottom of the lid in a middle section of each lid side;
    a container having a plurality of side walls defining an opening, and a bottom and a container ridge disposed inside the side walls, the container further including a container fitted corner formed by two sides of the container, the container fitted corner matching the lid fitted corner, and a plurality of attaching snap fit cylinders along the container ridge located in a container middle section of each container side;
    a tamper resistant locking mechanism having an undetachable lid locking tab platform located past the lid and outside a lid perimeter profile, the undetachable lid locking tab platform attached to the top of the lid by a living hinge, and the undetachable lid locking tab platform further having an undetachable lid locking tab thereunder; and a container detachable locking tab located past the container and outside a container perimeter profile at a corner of the container and the container detachable locking tab located between a plurality of container handle ledges fixedly attached to the container;
    the lid fitted corner and the container fitted corner are both an enlarged arc that matches each other for allowing the lid to attach to the container in only one position and preventing the lid to be attached in other positions;
    the container detachable locking tab defining an opening in a shape of a triangle, and the undetachable lid locking tab is in a shape of a cylinder;
    wherein the lid attaches to the container when the bottom of the lid is supported on the container ridge and the receiving snap fit cylinders engage with the attaching snap fit cylinders in a non-permanent locking manner, and the tamper resistant locking mechanism is engaged when the undetachable lid locking tab engages with the detachable container locking tab; and
    wherein when the lid is removed by pulling a lid platform in an upward direction after the tamper resistant locking mechanism is engaged, the detachable container locking tab detaches from the container and the detachable container locking tab is securely attached underneath the undetachable lid locking tab platform to provide protection from any sharp edges of the detachable container locking tab.

11. The receptacle of claim 10, wherein the detachable container locking tab further includes four sides; and a breakaway portion disposed on only three of the sides of the detachable container locking tab.

12. The receptacle of claim 10, wherein the container handle ledge further includes a plurality of ribs for gripping by a user during detachment of the detachable container locking tab.

13. The receptacle of claim 12, wherein the plurality of ribs are located in various positions on the container handle ledge.

14. The receptacle of claim 10, wherein the container further includes a plurality of container snap fit support columns that support a snap fit platform surrounding the attaching snap fit cylinders inside the container; and a plurality of recessed portion forms outside the container and opposite each container snap fit support columns.

15. The receptacle of claim 10, wherein the lid further includes a lid locking ledge disposed around the top of the lid, and wherein the container further includes a container lock ledge disposed inside the container and below the opening of the container, and wherein when the lid is attached to the container, the lid is securely attached to by the lid locking ledge and the container locking ledges, and the lid is recessed within in the container.

16. The receptacle of claim 10, wherein the container further include a handle hook disposed on an opposite end of the container than the contained detachable locking tab.

17. A method of using a receptacle having a tamper resistant locking mechanism for produce and food stuff, comprises:
providing a receptacle having:
a lid having a plurality of sides, a top and a bottom, the lid further having a lid fitted corner disposed on the bottom of the lid and a plurality of receiving snap fit cylinders located on the bottom of the lid in a middle section of each lid side;
a container having a plurality of side walls defining an opening, and a bottom and a container ridge disposed inside the side walls, the container further including a container fitted corner formed by two sides of the container, the container fitted corner matching the lid fitted corner, and a plurality of attaching snap fit cylinders along the container ridge located in a container middle section of each container side;
a tamper resistant locking mechanism having an undetachable lid locking tab platform located past the lid and outside a lid perimeter profile, the undetachable lid locking tab platform attached to the top of the lid by a living hinge, and the undetachable lid locking tab platform further having an undetachable lid locking tab thereunder; and a container detachable locking tab located past the container and outside a container perimeter profile at a corner of the container and the container detachable locking tab located between a plurality of container handle ledges fixedly attached to the container;
the lid fitted corner and the container fitted corner are both an enlarged arc that matches each other for allowing the lid to attach to the container in only one position and preventing the lid to be attached in other positions;
the container detachable locking tab defining an opening in a shape of a triangle, and the undetachable lid locking tab is in a shape of a cylinder;
wherein the lid attaches to the container when the bottom of the lid is supported on the container ridge and the receiving snap fit cylinders engage with the attaching snap fit cylinders in a non-permanent locking manner, and the tamper resistant locking mechanism is engaged when the undetachable lid locking tab engages with the detachable container locking tab; and
wherein when the lid is removed by pulling a lid platform in an upward direction after the tamper resistant locking mechanism is engaged, the detachable container locking tab detaches from the container and the detachable container locking tab is securely attached underneath the undetachable lid locking tab platform to provide protection from any sharp edges of the detachable container locking tab;
attaching the lid to the container to allow the bottom of the lid to be supported on the container ridge;
engaging the receiving snap fit cylinders with the attaching snap fit cylinders in a non-permanent locking manner; and
engaging the tamper resistant locking mechanism to engage the undetachable lid locking tab with the detachable container locking tab.

18. The method of claim 17, further comprising:
placing produce and/or food stuff into the container before attaching the lid to the container.

19. The method of claim 17, further comprising:
allowing the lid to be removed after the tamper resistant locking mechanism is engaged, and the detachable container locking tab detaches from the container and the detachable container locking tab is securely attached underneath the undetachable lid locking tab platform to provide protection from any sharp edges of the detachable container locking tab.

* * * * *